(12) United States Patent
Huang et al.

(10) Patent No.: US 8,490,284 B2
(45) Date of Patent: Jul. 23, 2013

(54) GEAR AND METHOD FOR FORMING TOOTH PROFILE THEREOF

(75) Inventors: Chin-Lung Huang, Hsinchu (TW); Kuang-Rong Chang, Hsinchu (TW); Shi-Duang Chen, Hsinchu (TW)

(73) Assignee: Luren Precision Co., Ltd., Hsinchu (TW)

( * ) Notice: Subject to any disclaimer, the term of this patent is extended or adjusted under 35 U.S.C. 154(b) by 927 days.

(21) Appl. No.: 12/576,778

(22) Filed: Oct. 9, 2009

(65) Prior Publication Data

US 2011/0083523 A1 Apr. 14, 2011

(51) Int. Cl.
*B21K 1/30* (2006.01)
(52) U.S. Cl.
USPC ..................................... 29/893.35
(58) Field of Classification Search
USPC ..................................... 29/893.35
See application file for complete search history.

(56) References Cited

U.S. PATENT DOCUMENTS

| 3,673,660 | A | * | 7/1972 | Osplack et al. | 29/893.35 |
| 6,101,892 | A | * | 8/2000 | Berlinger et al. | 74/462 |
| 6,769,891 | B2 | | 8/2004 | Morselli | |
| 2009/0008615 | A1 | * | 1/2009 | Young et al. | 254/133 R |

* cited by examiner

*Primary Examiner* — David Bryant
*Assistant Examiner* — Moshe Wilensky
(74) *Attorney, Agent, or Firm* — Muncy, Geissler, Olds & Lowe, PLLC

(57) ABSTRACT

The present invention discloses a gear and a method for forming a tooth profile thereof. In the method of the present invention, a cubic curve is used to modify a basic tooth shape of a standard rack to obtain an amended basic tooth shape, wherein the cubic curve contacts tangentially with the basic tooth shape at the midpoint of a dedendum, a midpoint of a lateral and a midpoint of an addendum of the basic tooth shape. The amended basic tooth shape is reproduced to obtain an amended rack, and the amended rack is further used to generate a tooth profile of a desired gear.

2 Claims, 6 Drawing Sheets

GEAR AND METHOD FOR FORMING TOOTH PROFILE THEREOF

FIELD OF THE INVENTION

The present invention relates to a gear, particularly to a gear whose contact path is a smooth continuous curve. The present invention also relates to a method for forming a tooth profile of the gear, which uses a cubic curve to modify the tooth shape of a standard rack and uses the amended rack to generate a gear.

BACKGROUND OF THE INVENTION

Referring to FIG. 1, the conventional rotary gear pump 1 has a pump casing 2 and also has a driving gear 3 and a driven gear 4 both arranged inside the pump casing 2. When the driving gear 3 rotates in one direction, the driven gear 4 is driven to rotate in the opposite direction. Thereby, a fluid is driven to flow in the space between the teeth and then pumped out from an output end 5.

The tooth profile of a gear can be generated by a rack. Refer to FIG. 2 for two involute gears 6 meshing with each other inside the rotary gear pump 1. The tooth profile of the involute gear 6 including an involute 8, a root fillet 9 and a rounded tip 10.

When the two involute gears 6 mesh to rotate, the contact points 7 thereof form a contact path 11. As shown in FIG. 2, the contact path 11 is an unsmooth continuous curve including two straight lines and two arcs. The straight lines are generated by the contacting of the involutes 8 of the two involute gears 6. The arcs are generated by the contacting of the rounded tip 10 and root fillet 9 of the two involute gears 6. In the contact path 11, the tangent of the arc and the tangent of the straight line are not continuous. Therefore, the contact path 11 is not a smooth continuous curve. It means that the first-order derivatives of the contact path 11, i.e. the tangents thereof, are discontinuous.

For a rotary gear pump 1, a discontinuous contact path 11 of the involute gears 6 results in rippled pressure in the outlet end 5 and causes noise in operation. Thus, the rotary gear pump 1 hardly can achieve a precise and stable output and it is unlikely to meet the requirement of high-precision, high-stability and high-quality products, such as medical pumps.

Most of the rotary gear pumps 1 are used to pump fluids, especially fluids almost without compressibility. Refer to FIG. 3 for the meshing state of the two gears shown in FIG. 2. An encapsulation 14 may form between the addendum 12 and the dedendum 13 when two point-contacts occur in some moments during the meshing of the two involute gears 6. The fluid trapped in the encapsulation 14 is not allowed to leave. Thus, the pressurized incompressible fluid may damage the machine and generate noise.

SUMMARY OF THE INVENTION

One objective of the present invention is to provide a gear and a method for forming a tooth profile thereof, which can implement a gear having a smooth continuous contact path and realize stable fluid supply noiselessly.

Another objective of the present invention is to provide a gear and a forming method thereof, wherein none encapsulation occurs in gear meshing, and whereby none mechanical structure is damaged by the pressurized incompressible fluid.

To achieve the above-mentioned objectives, the present invention proposes a method for forming a tooth profile of a gear, which comprises steps: acquiring a standard rack according to a gear module of the desired gear, wherein the basic tooth shape of the standard rack includes a lateral, an addendum and a dedendum; using a cubic curve to modify the basic tooth shape of the standard rack and obtain an amended basic tooth shape, wherein the cubic curve contacts tangentially with the basic tooth shape at the midpoints of the dedendum, lateral and addendum, and wherein the coefficients of the equation of the cubic curve can be derived from the tangent points and can be parameterized with a pressure angle, a total tooth depth and a tooth width; reproducing the amended basic tooth shape to obtain an amended rack, and using the amended rack to generate a tooth profile of the gear.

The present invention also proposes a gear, whose tooth profile is generated according to the above-mentioned amended rack, and whose contact path is a smooth continuous curve, whereby the gear of the present invention can achieve noiseless operation and implement stable and unrippled output.

DETAILED DESCRIPTION OF THE PREFERRED EMBODIMENTS

The technical features of the present invention are described in detail with the embodiments or the explanations below. However, it should be understood that the embodiments or the explanations are only to demonstrate the present invention but not to limit the scope thereof.

Figure 1:
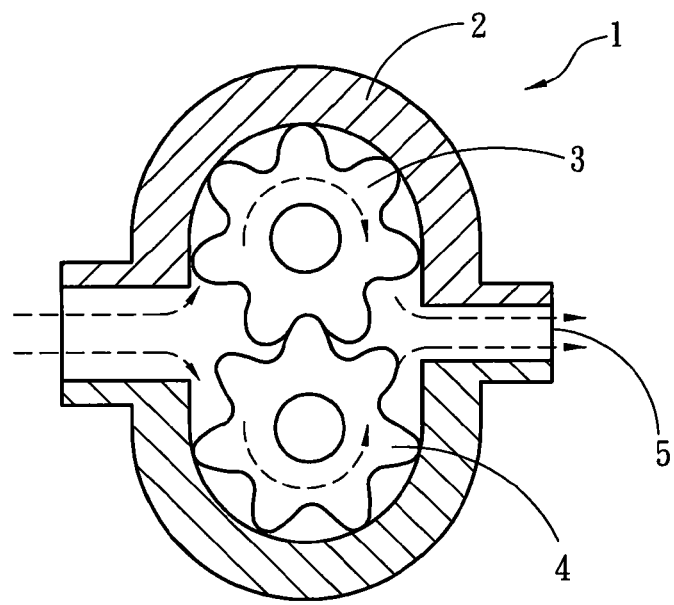
FIG. 1 is a diagram schematically showing a conventional rotary gear pump.
Figure 2:
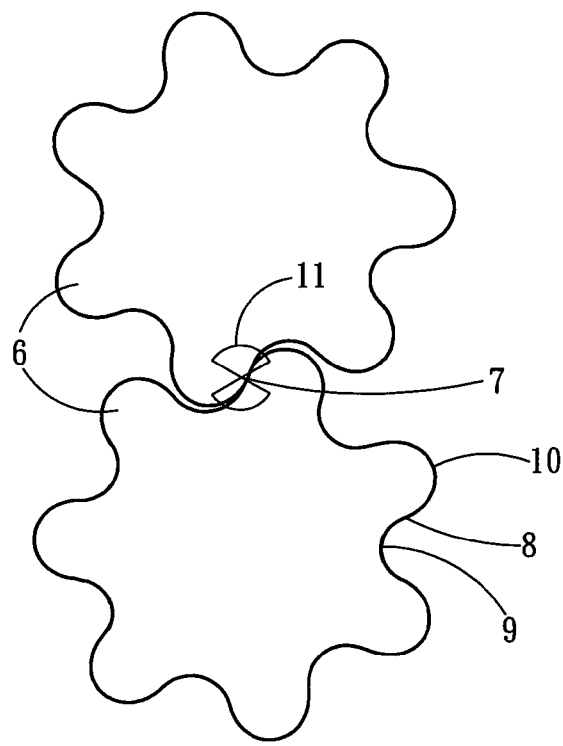
FIG. 2 is a diagram schematically showing that two involute gears mesh with each other inside a conventional rotary gear pump.
Figure 3:
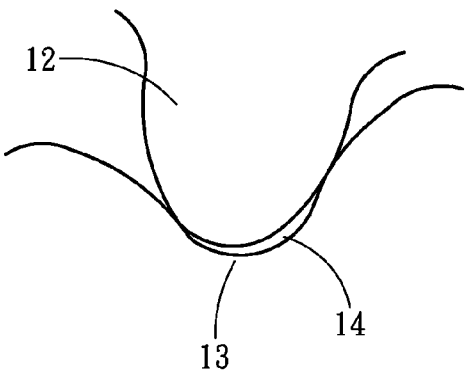
FIG. 3 is a diagram schematically showing the meshing state of two conventional gears.
Figure 4:
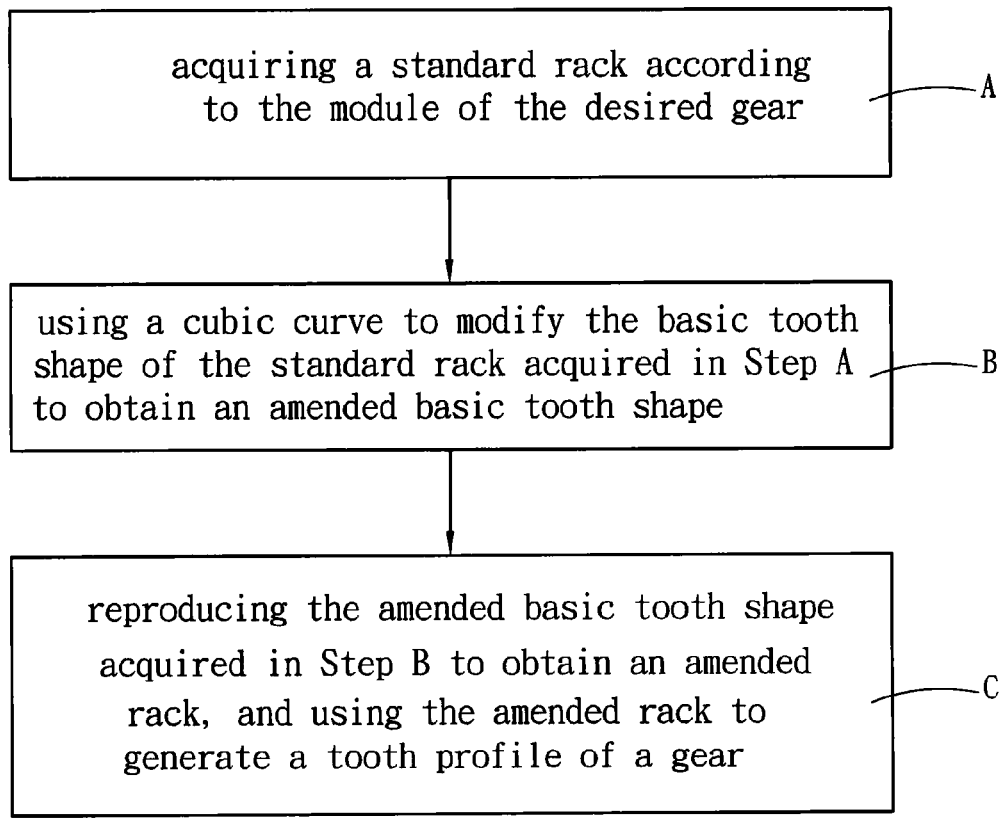
FIG. 4 is a flowchart of a method for forming a tooth profile of a gear according to the present invention.

Refer to FIG. 4 for a flowchart of a method for forming a tooth profile of a gear according to the present invention, which comprises steps:

A. acquiring a standard rack according to the gear module of the desired gear;

B. using a cubic curve to modify the basic tooth shape of the standard rack acquired in Step A to obtain an amended basic tooth shape;

C. reproducing the amended basic tooth shape acquired in Step B to obtain an amended rack, and using the amended rack to generate a tooth profile of the gear.

The above-mentioned steps are described in detail as follows. In Step A, a standard rack is acquired according to a gear module m. The gear module m is determined by a tooth number n, a pitch diameter $P_d$ and a helix angle $\beta_p$ and expressed by Equation (1):

$$m = \frac{P_d \cos \beta_p}{n} \quad (1)$$

Figure 5:
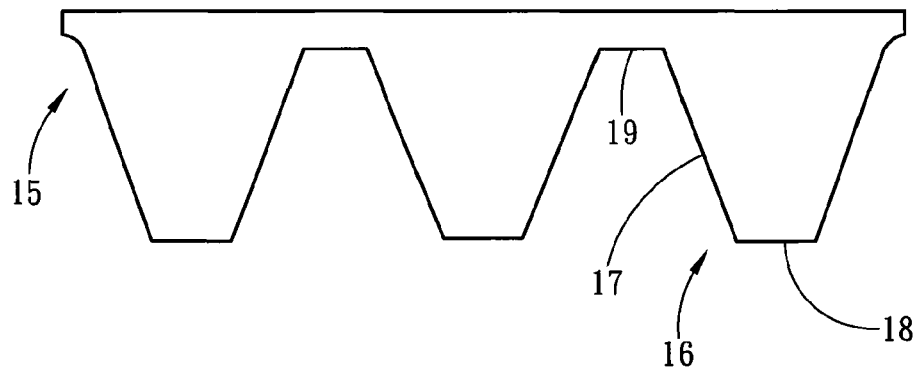
FIG. 5 is a diagram schematically showing a standard rack used in Step A according to the present invention.

Referring to FIG. 5, the gear module m can be used to acquire a standard rack 15 to generate a tooth profile of a gear. The standard rack 15 includes a plurality of basic tooth shapes 16 each having a lateral 17, an addendum 18 and a dedendum 19.

Figure 6:
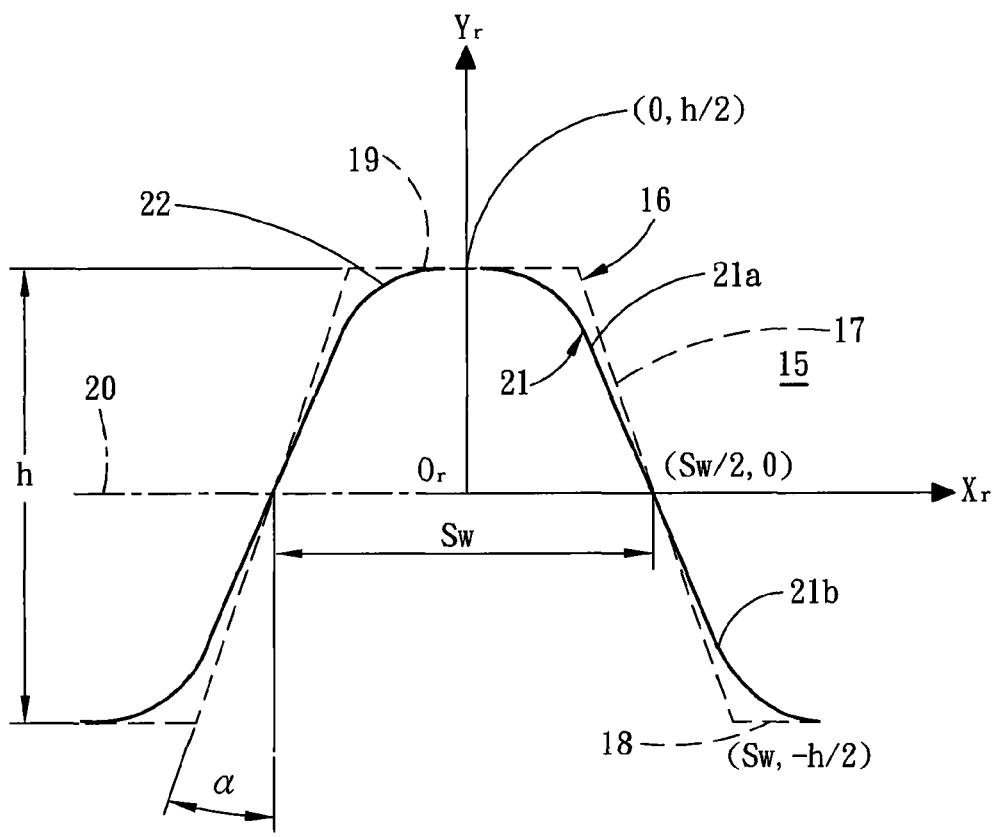
FIG. 6 is a diagram schematically showing a cubic curve is used to modify the basic tooth shape shown in FIG. 5 to obtain an amended basic tooth shape according to the present invention.

Refer to FIG. 6 for a diagram schematically showing a cubic curve is used to modify the basic tooth shape in Step B. In FIG. 6, the dotted curve represents the basic tooth shape 16 of the standard rack 15 acquired in Step A. In Step B, a cubic curve 21 is used to modify the basic tooth shape 16 to obtain an amended basic tooth shape 22. Firstly, the cubic curve 21 is established on a Cartesian coordinate system $(X_r, Y_r)$, wherein the origin $O_r$ of the Cartesian coordinate system is set at the center of the tooth width $S_w$ on the pitch line 20, and wherein the pitch line 20 is collinear with the $X_r$ axis of the Cartesian coordinate system. The rack height of the standard rack 15 is h, which is also the total tooth depth of the desired gear. The pressure angle is equal to $\alpha$.

The amended basic tooth shape 22 can be described with the cubic curve 21. For convenience, the cubic curve 21 is divided into an upper partial curve 21a above the $X_r$ axis and a lower partial curve 21b below the $X_r$ axis, which are respectively expressed by Equation (2) and Equation (3):

$$\begin{aligned} x_{r1} &= u \\ y_{r1} &= a_1 u^3 + b_1 u^2 + \frac{h}{2} \end{aligned} \quad 0 \leq u \leq \frac{Sw}{2} \quad (2)$$

$$\begin{aligned} x_{r2} &= u + Sw \\ y_{r2} &= a_2 u^3 + b_2 u^2 - \frac{h}{2} \end{aligned} \quad -\frac{Sw}{2} < u \leq 0 \quad (3)$$

Each basic tooth shape 16 of the standard rack 15 contacts tangentially with the cubic curve 21 at three tangent points, including the midpoint (0, h/2) of the dedendum 19, the midpoint ($S_w$/2, 0) of the lateral 17, and the midpoint ($S_w$, −h/2) of the addendum 18. The above-mentioned three tangent points can be used to express the coefficients of Equations (2) and (3) as Equations (4) and (5):

$$a_1 = \frac{-4Sw\cot\alpha + 8h}{Sw^3} \quad (4)$$

$$b_1 = \frac{2Sw\cot\alpha - 6h}{Sw^2}$$

$$a_2 = \frac{-4Sw\cot\alpha + 8h}{Sw^3} \quad (5)$$

$$b_2 = \frac{-2Sw\cot\alpha + 6h}{Sw^2}$$

The cubic curve 21 can be used to obtain an amended basic tooth shape 22 via a reflection method.

The tooth width $S_w$ can be calculated from the gear module m and expressed by Equation (6):

$$Sw = \frac{\pi \cdot m}{2} \quad (6)$$

Suppose that the outside diameter $O_d$ and the root diameter $R_d$ of the desired gear are known. The pitch diameter $P_d$ and the total tooth depth h can be respectively calculated with Equations (7) and (8):

$$P_d = \frac{O_d + R_d}{2} \quad (7)$$

$$h = \frac{O_d - R_d}{2} \quad (8)$$

The pitch diameter $P_d$ is an average of the outer diameter $O_d$ and the root diameter $R_d$. The preset helix angle $\beta_p$, the tooth number n and the pitch diameter $P_d$ can be used to calculate the gear module m according to Equation (1).

Figure 7:
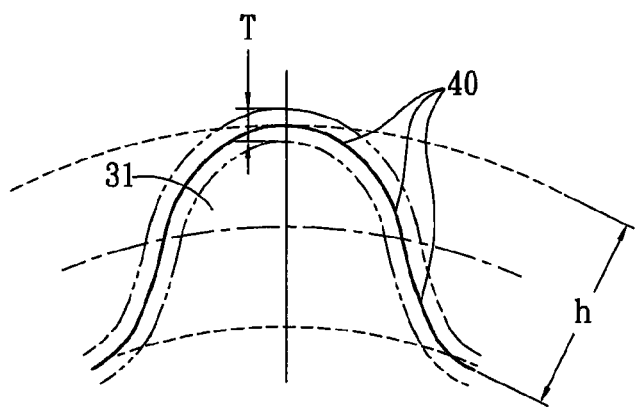
FIG. 7 is a diagram schematically showing a tooth profile of a gear and a tolerance of the tooth profile according to the present invention.

Equation (6) can be used to obtain the tooth width $S_w$ on the pitch line 20. Substituting the tooth width $S_w$, the total tooth depth h, and the pressure angle $\alpha$ into Equations (4) and (5) can obtain the cubic curve 21. Reflecting the cubic curve 21 can obtain the amended basic tooth shape 22. In Step C, the amended basic tooth shape 22 is reproduced to obtain a complete amended rack to generate a tooth profile 40 of a gear. As using a rack to generate a tooth profile of a gear is a conventional technology, it will not repeat herein. Referring to FIG. 7, the tooth profile 40 generated by the present invention has a tolerance T about 5% of the total tooth depth h.

The method for forming a tooth profile of the present invention can be applied to generate the tooth profile of a helical gear.

Figure 8:
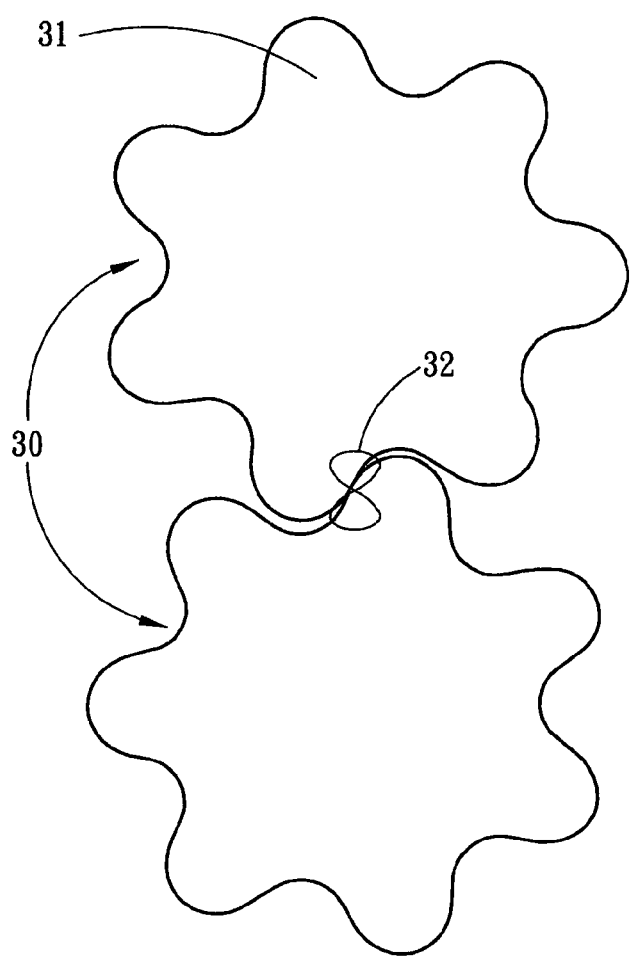
FIG. 8 is a diagram schematically showing a smooth continuous contact path of two meshing gears according to the present invention.
Figure 9A:
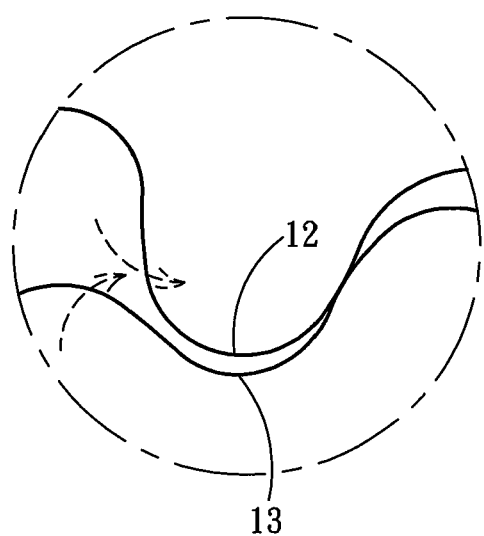
FIGS. 9A-9D are diagrams schematically shows that none encapsulation occurs in the operation of gears according to the present invention.
Figure 9B:
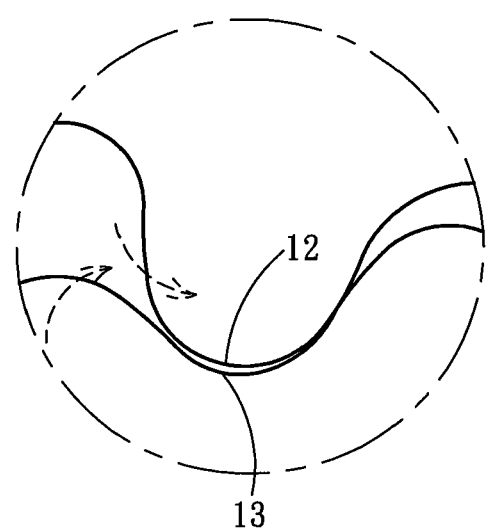
Figure 9C:
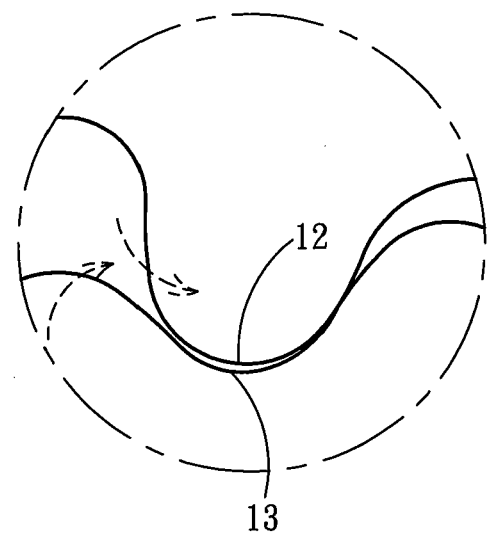
Figure 9D:
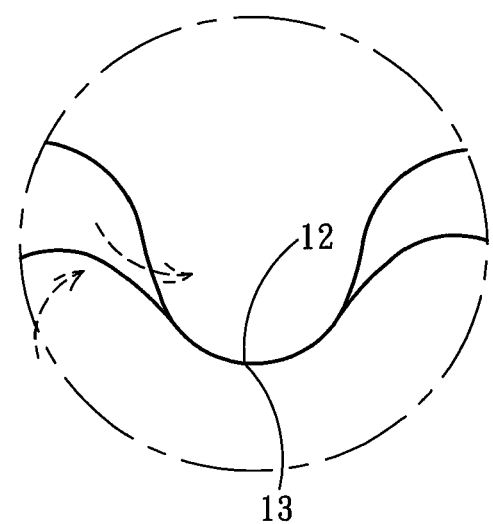

Referring to FIG. 8, the present invention also proposes a gear 30 whose tooth profile 40 is generated with the method described above. The gear 30 comprises at least one tooth 31 meshing with the corresponding gear and is characterized in that the contact path 32 thereof is a smooth continuous curve. The gear 30 can be used in a rotary gear pump. In a preferred embodiment, the standard rack 15 has a pressure angle $\alpha$ of 22-28 degrees, and the gear 30 has a total gear depth h smaller than or equal to 1.5 times of the gear module m. Therefore, none encapsulation 14 will occur in the preferred embodiment.

The gear 30 shown in FIG. 8 includes seven teeth and has a smooth continuous contact path 32 in rotation. Therefore, the rotary gear pump using the gears 30 is exempt from rippled pressure in the output.

Attached to the last of the specification, there are Tables 1 to 12 listing the parameters of gears respectively having from one to twelve teeth. These gears will not generate any encapsulation in meshing. In the tables, the origin of the coordinate system is set at the center of the pitch circle of the gear, and the coordinates (X, Y) depict the tooth profile of the gear. FIGS. 9A-9D schematically shows that the gear of Table 7 will not generate any encapsulation 14 in operation.

In addition, the tooth profile formed by the present invention is capable to apply to helical gears used in a rotary gear pump, especially a rotary gear pump for pumping fluid, for example, an external gear pump or a rotary positive-displacement pump.

The embodiments described above are only to exemplify the present invention but not to limit the scope of the present invention. Therefore, any equivalent modification or variation according to the spirit of the present invention is to be also included within the scope of the present invention.

TABLE 1

A

Basic geometric parameter

| | | |
|---|---|---|
| Tooth number | n | 1 |
| Outside diameter | $O_d$ | 11.874 mm |
| Root diameter | $R_d$ | −1.126 mm |
| Pitch diameter | $P_d$ | 5.347 mm |
| Helix angel | $\beta_p$ | 21.5° |
| Module | m | 5.0 |

Rack parameter

| | | |
|---|---|---|
| Rack space width on pitch | Sw | 7.854 mm |
| Rack height | h | 6.5 mm |
| pressure angel | α | 28° |

B

| X | Y |
|---|---|
| 0.00 | 5.94 |
| 0.15 | 5.93 |
| 0.30 | 5.92 |
| 0.44 | 5.91 |
| 0.58 | 5.89 |
| 0.72 | 5.86 |
| 0.86 | 5.83 |
| 1.00 | 5.79 |
| 1.13 | 5.75 |
| 1.27 | 5.70 |
| 1.42 | 5.64 |
| 1.56 | 5.57 |
| 1.71 | 5.49 |
| 1.87 | 5.39 |
| 2.03 | 5.28 |
| 2.20 | 5.16 |
| 2.37 | 5.01 |
| 2.54 | 4.85 |
| 2.72 | 4.66 |
| 2.90 | 4.44 |
| 3.07 | 4.19 |
| 3.24 | 3.91 |
| 3.39 | 3.59 |
| 3.52 | 3.24 |
| 3.62 | 2.86 |
| 3.69 | 2.46 |
| 3.70 | 2.03 |
| 3.66 | 1.60 |
| 3.55 | 1.18 |
| 3.39 | 0.79 |
| 3.18 | 0.45 |
| 2.93 | 0.18 |
| 2.69 | 0.00 |
| 2.49 | −0.09 |
| 2.35 | −0.13 |
| 2.26 | −0.14 |
| 2.21 | −0.14 |
| 2.19 | −0.14 |
| 2.18 | −0.14 |
| 2.17 | −0.14 |
| 2.17 | −0.14 |
| 2.16 | −0.13 |
| 2.14 | −0.12 |
| 2.11 | −0.11 |
| 2.08 | −0.09 |
| 2.03 | −0.06 |
| 1.97 | −0.03 |
| 1.91 | 0.01 |
| 1.83 | 0.05 |
| 1.75 | 0.10 |
| 1.66 | 0.15 |
| 1.56 | 0.20 |
| 1.45 | 0.25 |
| 1.34 | 0.30 |
| 1.22 | 0.34 |
| 1.10 | 0.39 |

TABLE 1-continued

| X | Y |
|---|---|
| 0.98 | 0.43 |
| 0.85 | 0.46 |
| 0.72 | 0.49 |
| 0.60 | 0.51 |
| 0.47 | 0.53 |
| 0.35 | 0.55 |
| 0.23 | 0.56 |
| 0.11 | 0.56 |
| 0.00 | 0.56 |

TABLE 2

A

Basic geometric parameter

| | | |
|---|---|---|
| Tooth number | n | 2 |
| Outside diameter | $O_d$ | 17.848 mm |
| Root diameter | $R_d$ | 3.648 mm |
| Pitch diameter | $P_d$ | 10.748 mm |
| Helix angel | $\beta_p$ | 21.5° |
| Module | m | 5.0 |

Rack parameter

| | | |
|---|---|---|
| Rack space width on pitch | Sw | 7.854 mm |
| Rack height | h | 7.1 mm |
| pressure angel | α | 25° |

B

| X | Y |
|---|---|
| 0.00 | 8.92 |
| 0.13 | 8.92 |
| 0.25 | 8.92 |
| 0.37 | 8.91 |
| 0.49 | 8.89 |
| 0.61 | 8.87 |
| 0.72 | 8.85 |
| 0.84 | 8.83 |
| 0.95 | 8.80 |
| 1.06 | 8.76 |
| 1.17 | 8.72 |
| 1.28 | 8.68 |
| 1.40 | 8.63 |
| 1.51 | 8.57 |
| 1.63 | 8.51 |
| 1.76 | 8.44 |
| 1.89 | 8.36 |
| 2.02 | 8.27 |
| 2.15 | 8.17 |
| 2.30 | 8.05 |
| 2.44 | 7.92 |
| 2.60 | 7.77 |
| 2.75 | 7.60 |
| 2.91 | 7.42 |
| 3.07 | 7.21 |
| 3.22 | 6.98 |
| 3.38 | 6.72 |
| 3.52 | 6.44 |
| 3.65 | 6.13 |
| 3.76 | 5.81 |
| 3.85 | 5.46 |
| 3.90 | 5.11 |
| 3.93 | 4.75 |
| 3.92 | 4.40 |
| 3.87 | 4.08 |
| 3.80 | 3.80 |
| 3.72 | 3.58 |
| 3.63 | 3.41 |
| 3.56 | 3.28 |
| 3.50 | 3.18 |
| 3.43 | 3.10 |
| 3.38 | 3.03 |
| 3.32 | 2.96 |
| 3.26 | 2.90 |
| 3.20 | 2.84 |

TABLE 2-continued

| | |
|---|---|
| 3.14 | 2.77 |
| 3.07 | 2.70 |
| 3.00 | 2.63 |
| 2.93 | 2.55 |
| 2.85 | 2.47 |
| 2.77 | 2.38 |
| 2.69 | 2.29 |
| 2.61 | 2.19 |
| 2.52 | 2.08 |
| 2.45 | 1.97 |
| 2.37 | 1.86 |
| 2.30 | 1.74 |
| 2.23 | 1.62 |
| 2.16 | 1.50 |
| 2.10 | 1.37 |
| 2.05 | 1.24 |
| 2.00 | 1.11 |
| 1.96 | 0.98 |
| 1.93 | 0.85 |
| 1.90 | 0.72 |
| 1.87 | 0.60 |
| 1.85 | 0.47 |
| 1.84 | 0.35 |
| 1.83 | 0.23 |
| 1.83 | 0.11 |
| 1.82 | 0.00 |
| 1.85 | 0.47 |

TABLE 3

A

Basic geometric parameter

| | | | |
|---|---|---|---|
| Tooth number | $n$ | 3 | |
| Outside diameter | $O_d$ | 22.922 | mm |
| Root diameter | $R_d$ | 9.322 | mm |
| Pitch diameter | $P_d$ | 16.122 | mm |
| Helix angle | $\beta_p$ | 21.5° | |
| Module | $m$ | 5.0 | |

Rack parameter

| | | | |
|---|---|---|---|
| Rack space width on pitch | $Sw$ | 7.854 | mm |
| Rack height | $h$ | 6.8 | mm |
| pressure angle | $\alpha$ | 27° | |

B

| X | Y |
|---|---|
| 0.00 | 11.46 |
| 0.13 | 11.46 |
| 0.25 | 11.45 |
| 0.37 | 11.44 |
| 0.50 | 11.42 |
| 0.62 | 11.40 |
| 0.74 | 11.38 |
| 0.86 | 11.35 |
| 0.98 | 11.31 |
| 1.10 | 11.27 |
| 1.23 | 11.23 |
| 1.35 | 11.17 |
| 1.48 | 11.12 |
| 1.61 | 11.05 |
| 1.74 | 10.97 |
| 1.87 | 10.89 |
| 2.01 | 10.80 |
| 2.15 | 10.70 |
| 2.29 | 10.58 |
| 2.43 | 10.46 |
| 2.58 | 10.32 |
| 2.72 | 10.17 |
| 2.87 | 10.00 |
| 3.02 | 9.82 |
| 3.16 | 9.62 |
| 3.30 | 9.40 |
| 3.44 | 9.17 |

TABLE 3-continued

| | |
|---|---|
| 3.57 | 8.93 |
| 3.68 | 8.67 |
| 3.79 | 8.39 |
| 3.88 | 8.11 |
| 3.95 | 7.82 |
| 4.00 | 7.53 |
| 4.03 | 7.25 |
| 4.03 | 6.98 |
| 4.02 | 6.74 |
| 4.00 | 6.53 |
| 3.98 | 6.35 |
| 3.95 | 6.18 |
| 3.92 | 6.03 |
| 3.90 | 5.89 |
| 3.87 | 5.76 |
| 3.84 | 5.63 |
| 3.81 | 5.51 |
| 3.78 | 5.38 |
| 3.75 | 5.26 |
| 3.72 | 5.13 |
| 3.70 | 5.00 |
| 3.67 | 4.88 |
| 3.65 | 4.75 |
| 3.63 | 4.61 |
| 3.61 | 4.48 |
| 3.60 | 4.35 |
| 3.59 | 4.21 |
| 3.59 | 4.08 |
| 3.59 | 3.94 |
| 3.59 | 3.81 |
| 3.60 | 3.67 |
| 3.62 | 3.54 |
| 3.64 | 3.41 |
| 3.67 | 3.28 |
| 3.70 | 3.15 |
| 3.73 | 3.02 |
| 3.77 | 2.90 |
| 3.82 | 2.78 |
| 3.87 | 2.66 |
| 3.92 | 2.55 |
| 3.98 | 2.44 |
| 4.04 | 2.33 |

TABLE 4

A

Basic geometric parameter

| | | | |
|---|---|---|---|
| Tooth number | $n$ | 4 | |
| Outside diameter | $O_d$ | 28.396 | mm |
| Root diameter | $R_d$ | 14.596 | mm |
| Pitch diameter | $P_d$ | 21.496 | mm |
| Helix angle | $\beta_p$ | 21.5° | |
| Module | $m$ | 5.0 | |

Rack parameter

| | | | |
|---|---|---|---|
| Rack space width on pitch | $Sw$ | 7.854 | mm |
| Rack height | $h$ | 6.9 | mm |
| pressure angle | $\alpha$ | 27° | |

B

| X | Y |
|---|---|
| 0.00 | 14.20 |
| 0.12 | 14.20 |
| 0.24 | 14.19 |
| 0.37 | 14.18 |
| 0.49 | 14.16 |
| 0.61 | 14.14 |
| 0.73 | 14.12 |
| 0.85 | 14.08 |
| 0.97 | 14.05 |
| 1.09 | 14.01 |
| 1.21 | 13.96 |
| 1.34 | 13.91 |

TABLE 4-continued

| | |
|---|---|
| 1.46 | 13.85 |
| 1.59 | 13.78 |
| 1.72 | 13.70 |
| 1.85 | 13.62 |
| 1.98 | 13.53 |
| 2.12 | 13.43 |
| 2.26 | 13.32 |
| 2.40 | 13.19 |
| 2.54 | 13.06 |
| 2.68 | 12.91 |
| 2.83 | 12.76 |
| 2.97 | 12.58 |
| 3.11 | 12.40 |
| 3.25 | 12.20 |
| 3.39 | 11.98 |
| 3.52 | 11.76 |
| 3.64 | 11.51 |
| 3.76 | 11.26 |
| 3.86 | 11.00 |
| 3.95 | 10.73 |
| 4.02 | 10.46 |
| 4.08 | 10.19 |
| 4.11 | 9.93 |
| 4.14 | 9.69 |
| 4.15 | 9.47 |
| 4.16 | 9.27 |
| 4.16 | 9.09 |
| 4.16 | 8.92 |
| 4.16 | 8.76 |
| 4.16 | 8.60 |
| 4.16 | 8.45 |
| 4.16 | 8.30 |
| 4.16 | 8.16 |
| 4.16 | 8.02 |
| 4.16 | 7.88 |
| 4.16 | 7.74 |
| 4.17 | 7.60 |
| 4.18 | 7.46 |
| 4.19 | 7.32 |
| 4.21 | 7.18 |
| 4.23 | 7.04 |
| 4.25 | 6.90 |
| 4.28 | 6.77 |
| 4.32 | 6.63 |
| 4.36 | 6.50 |
| 4.40 | 6.37 |
| 4.45 | 6.24 |
| 4.50 | 6.12 |
| 4.56 | 6.00 |
| 4.62 | 5.88 |
| 4.69 | 5.76 |
| 4.76 | 5.65 |
| 4.83 | 5.55 |
| 4.91 | 5.44 |
| 4.99 | 5.35 |
| 5.07 | 5.25 |
| 5.16 | 5.16 |

TABLE 5

A

Basic geometric parameter

| | | |
|---|---|---|
| Tooth number | n | 5 |
| Outside diameter | $O_d$ | 33.67 mm |
| Root diameter | $R_d$ | 20.07 mm |
| Pitch diameter | $P_d$ | 26.87 mm |
| Helix angel | $\beta_p$ | 21.5° |
| Module | m | 5.0 |

Rack parameter

| | | |
|---|---|---|
| Rack space width on pitch | Sw | 7.854 mm |
| Rack height | h | 6.8 mm |
| pressure angel | α | 27° |

TABLE 5-continued

B

| X | Y |
|---|---|
| 0.00 | 16.83 |
| 0.13 | 16.83 |
| 0.25 | 16.83 |
| 0.37 | 16.81 |
| 0.50 | 16.80 |
| 0.62 | 16.78 |
| 0.74 | 16.75 |
| 0.86 | 16.72 |
| 0.99 | 16.69 |
| 1.11 | 16.65 |
| 1.23 | 16.60 |
| 1.36 | 16.55 |
| 1.48 | 16.49 |
| 1.61 | 16.42 |
| 1.74 | 16.35 |
| 1.87 | 16.27 |
| 2.00 | 16.18 |
| 2.13 | 16.08 |
| 2.27 | 15.97 |
| 2.40 | 15.86 |
| 2.54 | 15.73 |
| 2.68 | 15.59 |
| 2.82 | 15.44 |
| 2.95 | 15.28 |
| 3.09 | 15.11 |
| 3.23 | 14.92 |
| 3.36 | 14.72 |
| 3.49 | 14.51 |
| 3.61 | 14.29 |
| 3.73 | 14.05 |
| 3.84 | 13.80 |
| 3.94 | 13.55 |
| 4.02 | 13.29 |
| 4.10 | 13.03 |
| 4.15 | 12.78 |
| 4.19 | 12.54 |
| 4.23 | 12.31 |
| 4.26 | 12.11 |
| 4.28 | 11.92 |
| 4.31 | 11.74 |
| 4.33 | 11.57 |
| 4.35 | 11.40 |
| 4.37 | 11.24 |
| 4.39 | 11.09 |
| 4.41 | 10.93 |
| 4.43 | 10.78 |
| 4.46 | 10.64 |
| 4.49 | 10.49 |
| 4.52 | 10.35 |
| 4.55 | 10.21 |
| 4.59 | 10.07 |
| 4.63 | 9.93 |
| 4.68 | 9.79 |
| 4.73 | 9.66 |
| 4.78 | 9.53 |
| 4.84 | 9.41 |
| 4.90 | 9.28 |
| 4.96 | 9.16 |
| 5.03 | 9.05 |
| 5.10 | 8.94 |
| 5.18 | 8.83 |
| 5.26 | 8.73 |
| 5.34 | 8.63 |
| 5.43 | 8.53 |
| 5.52 | 8.44 |
| 5.61 | 8.35 |
| 5.70 | 8.27 |
| 5.80 | 8.19 |
| 5.90 | 8.12 |

TABLE 6

A

Basic geometric parameter

| | | |
|---|---|---|
| Tooth number | n | 6 |
| Outside diameter | $O_d$ | 39.244 mm |
| Root diameter | $R_d$ | 25.244 mm |
| Pitch diameter | $P_d$ | 32.244 mm |
| Helix angel | $\beta_p$ | 21.5° |
| Module | m | 5.0 |

Rack parameter

| | | |
|---|---|---|
| Rack space width on pitch | Sw | 7.854 mm |
| Rack height | h | 7.0 mm |
| pressure angel | α | 25° |

B

| X | Y |
|---|---|
| 0.00 | 19.62 |
| 0.12 | 19.62 |
| 0.25 | 19.61 |
| 0.37 | 19.60 |
| 0.49 | 19.59 |
| 0.61 | 19.57 |
| 0.73 | 19.55 |
| 0.85 | 19.53 |
| 0.97 | 19.49 |
| 1.09 | 19.46 |
| 1.21 | 19.42 |
| 1.33 | 19.37 |
| 1.44 | 19.32 |
| 1.56 | 19.26 |
| 1.68 | 19.20 |
| 1.81 | 19.13 |
| 1.93 | 19.05 |
| 2.05 | 18.97 |
| 2.18 | 18.87 |
| 2.30 | 18.77 |
| 2.43 | 18.66 |
| 2.56 | 18.54 |
| 2.69 | 18.40 |
| 2.83 | 18.26 |
| 2.96 | 18.10 |
| 3.09 | 17.93 |
| 3.23 | 17.75 |
| 3.36 | 17.55 |
| 3.49 | 17.34 |
| 3.61 | 17.11 |
| 3.73 | 16.88 |
| 3.84 | 16.63 |
| 3.94 | 16.37 |
| 4.03 | 16.11 |
| 4.11 | 15.84 |
| 4.17 | 15.57 |
| 4.22 | 15.32 |
| 4.26 | 15.09 |
| 4.30 | 14.88 |
| 4.33 | 14.69 |
| 4.36 | 14.50 |
| 4.39 | 14.32 |
| 4.42 | 14.15 |
| 4.44 | 13.99 |
| 4.47 | 13.83 |
| 4.51 | 13.67 |
| 4.54 | 13.51 |
| 4.58 | 13.36 |
| 4.61 | 13.22 |
| 4.66 | 13.07 |
| 4.70 | 12.93 |
| 4.75 | 12.79 |
| 4.81 | 12.65 |
| 4.86 | 12.52 |
| 4.92 | 12.39 |
| 4.99 | 12.27 |
| 5.06 | 12.15 |
| 5.13 | 12.03 |
| 5.21 | 11.92 |
| 5.29 | 11.81 |
| 5.37 | 11.71 |
| 5.45 | 11.61 |
| 5.54 | 11.52 |
| 5.63 | 11.43 |
| 5.73 | 11.35 |
| 5.82 | 11.27 |
| 5.92 | 11.19 |
| 6.01 | 11.12 |
| 6.11 | 11.05 |
| 6.21 | 10.99 |
| 6.31 | 10.93 |

TABLE 7

A

Basic geometric parameter

| | | |
|---|---|---|
| Tooth number | n | 1 |
| Outside diameter | $O_d$ | 44.618 mm |
| Root diameter | $R_d$ | 30.618 mm |
| Pitch diameter | $P_d$ | 37.618 mm |
| Helix angel | $\beta_p$ | 21.5° |
| Module | m | 5.0 |

Rack parameter

| | | |
|---|---|---|
| Rack space width on pitch | Sw | 7.854 mm |
| Rack height | h | 7.0 mm |
| pressure angel | α | 25° |

B

| X | Y |
|---|---|
| 0.00 | 22.31 |
| 0.12 | 22.31 |
| 0.25 | 22.30 |
| 0.37 | 22.29 |
| 0.49 | 22.28 |
| 0.61 | 22.26 |
| 0.73 | 22.24 |
| 0.85 | 22.21 |
| 0.97 | 22.18 |
| 1.09 | 22.15 |
| 1.21 | 22.11 |
| 1.33 | 22.06 |
| 1.44 | 22.01 |
| 1.56 | 21.95 |
| 1.68 | 21.89 |
| 1.81 | 21.82 |
| 1.93 | 21.74 |
| 2.05 | 21.65 |
| 2.18 | 21.56 |
| 2.30 | 21.46 |
| 2.43 | 21.35 |
| 2.56 | 21.23 |
| 2.69 | 21.10 |
| 2.82 | 20.95 |
| 2.95 | 20.80 |
| 3.08 | 20.63 |
| 3.21 | 20.45 |
| 3.34 | 20.26 |
| 3.47 | 20.06 |
| 3.60 | 19.84 |
| 3.71 | 19.61 |
| 3.83 | 19.37 |
| 3.93 | 19.12 |
| 4.03 | 18.86 |
| 4.11 | 18.60 |
| 4.19 | 18.34 |
| 4.24 | 18.09 |
| 4.30 | 17.86 |
| 4.34 | 17.64 |
| 4.39 | 17.44 |
| 4.43 | 17.25 |
| 4.47 | 17.07 |
| 4.51 | 16.90 |

TABLE 7-continued

| | |
|---|---|
| 4.55 | 16.73 |
| 4.59 | 16.57 |
| 4.63 | 16.41 |
| 4.68 | 16.25 |
| 4.73 | 16.10 |
| 4.78 | 15.95 |
| 4.83 | 15.81 |
| 4.89 | 15.67 |
| 4.95 | 15.53 |
| 5.01 | 15.40 |
| 5.08 | 15.27 |
| 5.15 | 15.14 |
| 5.22 | 15.03 |
| 5.30 | 14.91 |
| 5.38 | 14.80 |
| 5.47 | 14.69 |
| 5.55 | 14.59 |
| 5.64 | 14.50 |
| 5.74 | 14.41 |
| 5.83 | 14.32 |
| 5.93 | 14.24 |
| 6.03 | 14.16 |
| 6.13 | 14.09 |
| 6.23 | 14.02 |
| 6.33 | 13.96 |
| 6.43 | 13.90 |
| 6.54 | 13.84 |
| 6.64 | 13.79 |

TABLE 8

A

Basic geometric parameter

| | | |
|---|---|---|
| Tooth number | n | 8 |
| Outside diameter | $O_d$ | 50.191 mm |
| Root diameter | $R_d$ | 35.791 mm |
| Pitch diameter | $P_d$ | 42.991 mm |
| Helix angel | $\beta_p$ | 21.5° |
| Module | m | 5.0 |

Rack parameter

| | | |
|---|---|---|
| Rack space width on pitch | Sw | 7.854 mm |
| Rack height | h | 7.2 mm |
| pressure angel | α | 23° |

B

| X | Y |
|---|---|
| 0.00 | 25.10 |
| 0.13 | 25.09 |
| 0.25 | 25.09 |
| 0.38 | 25.08 |
| 0.50 | 25.07 |
| 0.62 | 25.05 |
| 0.74 | 25.04 |
| 0.86 | 25.01 |
| 0.98 | 24.99 |
| 1.10 | 24.95 |
| 1.22 | 24.92 |
| 1.34 | 24.88 |
| 1.45 | 24.83 |
| 1.57 | 24.78 |
| 1.69 | 24.72 |
| 1.80 | 24.65 |
| 1.92 | 24.58 |
| 2.04 | 24.50 |
| 2.16 | 24.41 |
| 2.29 | 24.32 |
| 2.41 | 24.21 |
| 2.54 | 24.09 |
| 2.66 | 23.96 |
| 2.79 | 23.82 |
| 2.92 | 23.67 |
| 3.05 | 23.51 |

TABLE 8-continued

| | |
|---|---|
| 3.18 | 23.32 |
| 3.32 | 23.13 |
| 3.45 | 22.92 |
| 3.57 | 22.69 |
| 3.70 | 22.45 |
| 3.82 | 22.20 |
| 3.93 | 21.93 |
| 4.03 | 21.65 |
| 4.12 | 21.37 |
| 4.19 | 21.08 |
| 4.26 | 20.81 |
| 4.31 | 20.57 |
| 4.36 | 20.34 |
| 4.40 | 20.13 |
| 4.44 | 19.93 |
| 4.49 | 19.74 |
| 4.53 | 19.56 |
| 4.57 | 19.38 |
| 4.62 | 19.21 |
| 4.67 | 19.05 |
| 4.72 | 18.88 |
| 4.77 | 18.73 |
| 4.83 | 18.57 |
| 4.89 | 18.42 |
| 4.96 | 18.28 |
| 5.03 | 18.14 |
| 5.10 | 18.01 |
| 5.18 | 17.88 |
| 5.26 | 17.76 |
| 5.34 | 17.64 |
| 5.43 | 17.53 |
| 5.52 | 17.43 |
| 5.62 | 17.33 |
| 5.71 | 17.23 |
| 5.81 | 17.15 |
| 5.91 | 17.07 |
| 6.01 | 16.99 |
| 6.12 | 16.92 |
| 6.22 | 16.85 |
| 6.32 | 16.79 |
| 6.43 | 16.73 |
| 6.53 | 16.68 |
| 6.64 | 16.63 |
| 6.74 | 16.58 |
| 6.85 | 16.53 |

TABLE 9

A

Basic geometric parameter

| | | |
|---|---|---|
| Tooth number | n | 9 |
| Outside diameter | $O_d$ | 55.365 mm |
| Root diameter | $R_d$ | 41.365 mm |
| Pitch diameter | $P_d$ | 48.365 mm |
| Helix angel | $\beta_p$ | 21.5° |
| Module | m | 5.0 |

Rack parameter

| | | |
|---|---|---|
| Rack space width on pitch | Sw | 7.854 mm |
| Rack height | h | 7.0 mm |
| pressure angel | α | 25° |

B

| X | Y |
|---|---|
| 0.00 | 27.68 |
| 0.12 | 27.68 |
| 0.25 | 27.68 |
| 0.37 | 27.67 |
| 0.49 | 27.65 |
| 0.61 | 27.64 |
| 0.73 | 27.61 |
| 0.85 | 27.59 |
| 0.97 | 27.56 |

TABLE 9-continued

| | |
|---|---|
| 1.09 | 27.52 |
| 1.21 | 27.48 |
| 1.33 | 27.43 |
| 1.45 | 27.38 |
| 1.57 | 27.32 |
| 1.69 | 27.26 |
| 1.81 | 27.19 |
| 1.93 | 27.11 |
| 2.05 | 27.03 |
| 2.17 | 26.94 |
| 2.30 | 26.84 |
| 2.43 | 26.73 |
| 2.55 | 26.61 |
| 2.68 | 26.48 |
| 2.81 | 26.34 |
| 2.94 | 26.19 |
| 3.07 | 26.03 |
| 3.20 | 25.86 |
| 3.32 | 25.67 |
| 3.45 | 25.48 |
| 3.57 | 25.27 |
| 3.70 | 25.05 |
| 3.81 | 24.82 |
| 3.92 | 24.58 |
| 4.02 | 24.33 |
| 4.12 | 24.07 |
| 4.20 | 23.82 |
| 4.27 | 23.57 |
| 4.34 | 23.34 |
| 4.40 | 23.12 |
| 4.46 | 22.92 |
| 4.52 | 22.72 |
| 4.58 | 22.54 |
| 4.63 | 22.36 |
| 4.69 | 22.19 |
| 4.75 | 22.02 |
| 4.81 | 21.86 |
| 4.87 | 21.71 |
| 4.93 | 21.56 |
| 5.00 | 21.41 |
| 5.07 | 21.27 |
| 5.14 | 21.13 |
| 5.21 | 21.00 |
| 5.29 | 20.87 |
| 5.37 | 20.75 |
| 5.46 | 20.63 |
| 5.54 | 20.52 |
| 5.63 | 20.41 |
| 5.72 | 20.31 |
| 5.82 | 20.22 |
| 5.91 | 20.12 |
| 6.01 | 20.04 |
| 6.11 | 19.96 |
| 6.21 | 19.88 |
| 6.32 | 19.81 |
| 6.42 | 19.74 |
| 6.53 | 19.68 |
| 6.64 | 19.62 |
| 6.74 | 19.57 |
| 6.85 | 19.52 |
| 6.96 | 19.48 |
| 7.07 | 19.44 |

TABLE 10

A

Basic geometric parameter

| | | |
|---|---|---|
| Tooth number | n | 10 |
| Outside diameter | $O_d$ | 61.039 mm |
| Root diameter | $R_d$ | 46.439 mm |
| Pitch diameter | $P_d$ | 53.739 mm |
| Helix angle | $\beta_p$ | 21.5° |
| Module | m | 5.0 |

TABLE 10-continued

Rack parameter

| | | |
|---|---|---|
| Rack space width on pitch | Sw | 7.854 mm |
| Rack height | h | 7.3 mm |
| pressure angel | α | 23.5° |

B

| X | Y |
|---|---|
| 0.00 | 30.52 |
| 0.12 | 30.52 |
| 0.24 | 30.51 |
| 0.36 | 30.50 |
| 0.48 | 30.49 |
| 0.59 | 30.48 |
| 0.71 | 30.46 |
| 0.82 | 30.43 |
| 0.94 | 30.41 |
| 1.05 | 30.37 |
| 1.17 | 30.34 |
| 1.28 | 30.29 |
| 1.40 | 30.25 |
| 1.51 | 30.19 |
| 1.63 | 30.13 |
| 1.74 | 30.07 |
| 1.86 | 30.00 |
| 1.98 | 29.92 |
| 2.09 | 29.83 |
| 2.21 | 29.74 |
| 2.33 | 29.64 |
| 2.46 | 29.53 |
| 2.58 | 29.41 |
| 2.70 | 29.28 |
| 2.83 | 29.14 |
| 2.96 | 28.98 |
| 3.08 | 28.82 |
| 3.21 | 28.64 |
| 3.33 | 28.45 |
| 3.46 | 28.25 |
| 3.58 | 28.04 |
| 3.70 | 27.81 |
| 3.82 | 27.57 |
| 3.93 | 27.32 |
| 4.03 | 27.07 |
| 4.12 | 26.80 |
| 4.20 | 26.54 |
| 4.28 | 26.28 |
| 4.34 | 26.05 |
| 4.40 | 25.83 |
| 4.46 | 25.62 |
| 4.52 | 25.42 |
| 4.58 | 25.23 |
| 4.63 | 25.05 |
| 4.69 | 24.87 |
| 4.75 | 24.71 |
| 4.80 | 24.54 |
| 4.87 | 24.38 |
| 4.93 | 24.23 |
| 5.00 | 24.08 |
| 5.07 | 23.94 |
| 5.14 | 23.80 |
| 5.21 | 23.66 |
| 5.29 | 23.54 |
| 5.37 | 23.41 |
| 5.46 | 23.30 |
| 5.54 | 23.18 |
| 5.63 | 23.08 |
| 5.72 | 22.97 |
| 5.82 | 22.88 |
| 5.92 | 22.79 |
| 6.01 | 22.70 |
| 6.11 | 22.62 |
| 6.22 | 22.55 |
| 6.32 | 22.48 |
| 6.42 | 22.42 |
| 6.53 | 22.36 |
| 6.64 | 22.30 |
| 6.74 | 22.25 |
| 6.85 | 22.20 |

TABLE 10-continued

| | |
|---|---|
| 6.96 | 22.16 |
| 7.07 | 22.12 |
| 7.18 | 22.08 |

TABLE 11

A

Basic geometric parameter

| | | |
|---|---|---|
| Tooth number | $n$ | 11 |
| Outside diameter | $O_d$ | 66.313 mm |
| Root diameter | $R_d$ | 51.913 mm |
| Pitch diameter | $P_d$ | 59.113 mm |
| Helix angel | $\beta_p$ | 21.5° |
| Module | $m$ | 5.0 |

Rack parameter

| | | |
|---|---|---|
| Rack space width on pitch | $S_w$ | 7.854 mm |
| Rack height | $h$ | 7.2 mm |
| pressure angel | $\alpha$ | 24° |

B

| X | Y |
|---|---|
| 0.00 | 33.16 |
| 0.12 | 33.15 |
| 0.25 | 33.15 |
| 0.37 | 33.14 |
| 0.49 | 33.13 |
| 0.61 | 33.11 |
| 0.73 | 33.09 |
| 0.85 | 33.06 |
| 0.97 | 33.03 |
| 1.08 | 33.00 |
| 1.20 | 32.96 |
| 1.32 | 32.91 |
| 1.44 | 32.86 |
| 1.56 | 32.80 |
| 1.68 | 32.74 |
| 1.80 | 32.67 |
| 1.92 | 32.59 |
| 2.04 | 32.51 |
| 2.16 | 32.42 |
| 2.29 | 32.32 |
| 2.41 | 32.21 |
| 2.54 | 32.09 |
| 2.66 | 31.96 |
| 2.79 | 31.82 |
| 2.92 | 31.67 |
| 3.05 | 31.51 |
| 3.18 | 31.34 |
| 3.31 | 31.15 |
| 3.43 | 30.95 |
| 3.56 | 30.74 |
| 3.68 | 30.52 |
| 3.80 | 30.28 |
| 3.91 | 30.04 |
| 4.02 | 29.78 |
| 4.12 | 29.52 |
| 4.21 | 29.26 |
| 4.29 | 29.00 |
| 4.36 | 28.76 |
| 4.43 | 28.54 |
| 4.50 | 28.33 |
| 4.56 | 28.12 |
| 4.63 | 27.93 |
| 4.69 | 27.75 |
| 4.76 | 27.57 |
| 4.82 | 27.40 |
| 4.89 | 27.24 |
| 4.96 | 27.08 |
| 5.03 | 26.92 |
| 5.11 | 26.78 |
| 5.19 | 26.63 |
| 5.27 | 26.50 |
| 5.35 | 26.36 |
| 5.43 | 26.24 |
| 5.52 | 26.12 |
| 5.61 | 26.00 |
| 5.71 | 25.90 |
| 5.80 | 25.79 |
| 5.90 | 25.70 |
| 6.00 | 25.60 |
| 6.11 | 25.52 |
| 6.21 | 25.44 |
| 6.32 | 25.36 |
| 6.42 | 25.29 |
| 6.53 | 25.23 |
| 6.64 | 25.17 |
| 6.75 | 25.12 |
| 6.86 | 25.07 |
| 6.97 | 25.02 |
| 7.09 | 24.98 |
| 7.20 | 24.94 |
| 7.31 | 24.91 |

TABLE 12

A

Basic geometric parameter

| | | |
|---|---|---|
| Tooth number | $n$ | 12 |
| Outside diameter | $O_d$ | 71.687 mm |
| Root diameter | $R_d$ | 57.687 mm |
| Pitch diameter | $P_d$ | 64.487 mm |
| Helix angel | $\beta_p$ | 21.5° |
| Module | $m$ | 5.0 |

Rack parameter

| | | |
|---|---|---|
| Rack space width on pitch | $S_w$ | 7.854 mm |
| Rack height | $h$ | 7.2 mm |
| pressure angel | $\alpha$ | 23° |

B

| X | Y |
|---|---|
| 0.00 | 35.84 |
| 0.12 | 35.84 |
| 0.24 | 35.84 |
| 0.36 | 35.83 |
| 0.48 | 35.82 |
| 0.60 | 35.81 |
| 0.72 | 35.79 |
| 0.83 | 35.77 |
| 0.95 | 35.74 |
| 1.07 | 35.71 |
| 1.18 | 35.68 |
| 1.30 | 35.64 |
| 1.41 | 35.59 |
| 1.53 | 35.54 |
| 1.64 | 35.49 |
| 1.76 | 35.43 |
| 1.87 | 35.36 |
| 1.99 | 35.29 |
| 2.11 | 35.20 |
| 2.22 | 35.11 |
| 2.34 | 35.02 |
| 2.46 | 34.91 |
| 2.58 | 34.79 |
| 2.70 | 34.67 |
| 2.83 | 34.53 |
| 2.95 | 34.38 |
| 3.08 | 34.22 |
| 3.20 | 34.05 |
| 3.32 | 33.87 |
| 3.45 | 33.67 |
| 3.57 | 33.46 |
| 3.69 | 33.24 |
| 3.81 | 33.00 |
| 3.92 | 32.76 |

TABLE 12-continued

| | |
|---|---|
| 4.02 | 32.50 |
| 4.12 | 32.24 |
| 4.21 | 31.97 |
| 4.29 | 31.71 |
| 4.36 | 31.47 |
| 4.43 | 31.24 |
| 4.50 | 31.03 |
| 4.56 | 30.83 |
| 4.63 | 30.63 |
| 4.69 | 30.45 |
| 4.76 | 30.27 |
| 4.83 | 30.10 |
| 4.90 | 29.94 |
| 4.97 | 29.78 |
| 5.04 | 29.63 |
| 5.12 | 29.48 |
| 5.20 | 29.34 |
| 5.28 | 29.21 |
| 5.36 | 29.08 |
| 5.45 | 28.96 |
| 5.54 | 28.84 |
| 5.63 | 28.73 |
| 5.72 | 28.63 |
| 5.82 | 28.53 |
| 5.92 | 28.44 |
| 6.02 | 28.35 |
| 6.12 | 28.27 |
| 6.23 | 28.19 |
| 6.33 | 28.12 |
| 6.44 | 28.06 |
| 6.54 | 28.00 |
| 6.65 | 27.94 |
| 6.76 | 27.89 |
| 6.87 | 27.85 |
| 6.98 | 27.81 |
| 7.09 | 27.77 |
| 7.20 | 27.73 |
| 7.30 | 27.70 |
| 7.41 | 27.67 |

What is claimed is:

1. A method for forming a tooth profile of a gear, comprising (a) acquiring a standard rack according to a gear module of a desired gear, wherein said standard rack includes a plurality of basic tooth shapes each having a lateral, an addendum and a dedendum;

(b) establishing a Cartesian coordinate system (Xr, Yr) halt Xr axis and a Yr axis perpendicular to the Xr axis, wherein a origin of the Cartesian coordinate system is set at the center of a tooth width of the basic tooth shape, the desired gear having a amended basic tooth shape which can be described with a cubic curve, and the cubic curve being divided into an upper partial curve (xr1, yr1) above the Xr axis and a lower partial curve (xr2, yr2) below the Xr axis, which are respectively expressed by Equation (1) and Equation (2):

$$x_{r1} = u \quad (1)$$
$$y_{r1} = a_1 u^3 + b_1 u^2 + \frac{h}{2} \quad 0 \le u \le \frac{Sw}{2}$$

$$x_{r2} = u + Sw \quad (2)$$
$$y_{r2} = a_2 u^3 + b_2 u^2 - \frac{h}{2} \quad -\frac{Sw}{2} < u \le 0$$

wherein Sw is tooth width of the basic tooth shape, and h is total tooth depth of the desired gear;

(c) defining the cubic curve contacts tangentially with each basic tooth shape of the standard rack at three tangent points including a midpoint (0, h/2) of the dedendum, a midpoint (Sw/2, 0) of the lateral and a midpoint (Sw, −h/2) of the addendum, wherein the three tangent points can be used to express the coefficients of Equations (1) and (2) as Equations (3) and (4):

$$a_1 = \frac{-4Sw\cot\alpha + 8h}{Sw^3} \quad (3)$$
$$b_1 = \frac{2Sw\cot\alpha - 6h}{Sw^2}$$

$$a_2 = \frac{-4Sw\cot\alpha + 8h}{Sw^3} \quad (4)$$
$$b_2 = \frac{-2Sw\cot\alpha + 6h}{Sw^2}$$

wherein $\alpha$ is pressure angle of the standard rack;

(d) substituting the tooth width Sw, the total tooth depth h, and the pressure angle $\alpha$ into Equations (3) and (4) to obtain the coefficients a1, a2, b1, b2 and substituting the coefficients a1, a2, b1, b2 into Equations (1) and (2) to obtain the amended basic tooth shape; and (e) reproducing said amended basic tooth shape acquired in said step (d) to obtain an amended rack, and using said amended rack to generate a tooth profile of said desired gear.

2. The method for forming a tooth profile of a gear according to claim 1, wherein said pressure angle ranges from 22 to 28 degree, and said total gear depth is smaller than or equal to 1.5 times of said gear module.

* * * * *